(12) United States Patent
Michalek

(10) Patent No.: US 7,086,351 B1
(45) Date of Patent: Aug. 8, 2006

(54) TUBE GATE LATCH

(76) Inventor: Kenneth Michalek, 1100 NE. Whispering Winds, Ridgefield, WA (US) 98642

( * ) Notice: Subject to any disclaimer, the term of this patent is extended or adjusted under 35 U.S.C. 154(b) by 62 days.

(21) Appl. No.: 10/839,823

(22) Filed: May 5, 2004

(51) Int. Cl.
*A01K 1/00* (2006.01)

(52) U.S. Cl. .................................... 119/524

(58) Field of Classification Search ............... 119/524, 119/416, 427, 437, 444, 452, 482, 503, 510, 119/516; 292/108, 210, 253, 246, 250, DIG. 13; 47/32.5
See application file for complete search history.

(56) References Cited

U.S. PATENT DOCUMENTS

| 315,978 | A | | 4/1885 | Turner | |
|---|---|---|---|---|---|
| 727,494 | A | | 5/1903 | Thompson | |
| 762,481 | A | * | 6/1904 | Klipping | 160/328 |
| 889,482 | A | * | 6/1908 | Thompson | 246/89 |
| 1,421,573 | A | * | 7/1922 | Schaefer | 292/247 |
| 1,458,664 | A | * | 6/1923 | Schaefer | 292/247 |
| 2,501,774 | A | * | 3/1950 | Joyal | 119/745 |
| 2,770,482 | A | * | 11/1956 | Kusiek | 292/246 |
| 3,847,425 | A | * | 11/1974 | Kirk | 292/247 |
| 4,176,869 | A | | 12/1979 | Gilst | |
| 4,478,442 | A | * | 10/1984 | Martin | 292/248 |
| 4,683,934 | A | * | 8/1987 | Salsness | 160/328 |
| 4,687,238 | A | | 8/1987 | Mintz | |
| 5,076,621 | A | | 12/1991 | Taylor et al. | |
| 5,275,450 | A | | 1/1994 | Winter | |
| 5,876,075 | A | * | 3/1999 | Barthelmess, Jr. | 292/247 |
| 6,425,612 | B1 | | 7/2002 | Schaeffer | |

* cited by examiner

Primary Examiner—Son T. Nguyen
(74) Attorney, Agent, or Firm—Kurt M. Rylander

(57) ABSTRACT

A tube gate latch is provided including a latch arm, a sleeve attached to one end of said arm, wherein said sleeve is adapted to receiving a bolt through said sleeve, and a tube grip attached to a second end of said arm, wherein the grip is "U" shaped and rests upon, half wrapping around, a tube gate tube. Tube gate latch can further be provided with a chain hook, a chain attachment ring, and a chain a chain attached to said chain attachment ring and removably attachable to said chain hook.

2 Claims, 3 Drawing Sheets

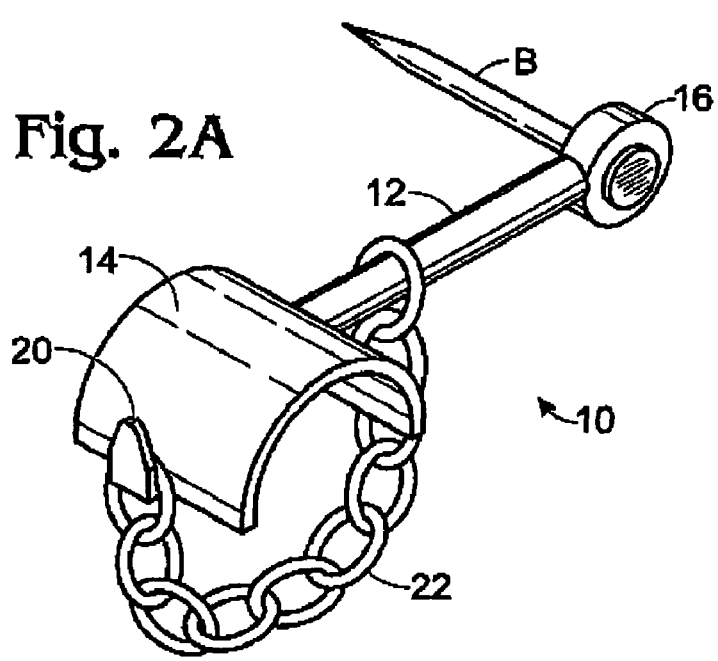

TUBE GATE LATCH

FIELD OF THE INVENTION

The present invention relates to livestock fencing. More particularly, the present invention relates to apparatus and methods for securing the gate on a livestock tube fence.

BACKGROUND

Many people own large animals such as horses, sheep, and cows for recreational use and for income. These animals need to be fenced in. One widely used method of fencing in livestock and other large animals includes use of a tube gate for ingress an egress of the animals. Constructed of metal tubes, a tube gate is frequently used for its strength and durability. It is necessary to secure the tube gate in some fashion to prevent unintended release of the animals. In doing so, there is a need to a mechanism that keeps the gate shut and is easy to operate.

The following represents a list of known related art:

| Reference: | Issued to: | Date of Issue: |
| --- | --- | --- |
| U.S. Pat. No. 315,978 | Turner | Apr. 14, 1885 |
| U.S. Pat. No. 727,494 | Thompson | May 5, 1903 |
| U.S. Pat. No. 4,176,869 | Gilst | Dec. 4, 1979 |
| U.S. Pat. No. 4,687,238 | Mintz | Aug. 18, 1987 |
| U.S. Pat. No. 5,076,621 | Taylor et al. | Dec. 31, 1991 |
| U.S. Pat. No. 5,275,450 | Winter | Jan. 4, 1994 |
| U.S. Pat. No. 6,425,612 | Schaeffer | Jul. 30, 2002 |

The teachings of each of the above-listed citations (which does not itself incorporate essential material by reference) are herein incorporated by reference. None of the above inventions and patents, taken either singularly or in combination, is seen to describe the instant invention as claimed.

SUMMARY AND ADVANTAGES

A tube gate latch is provided including a latch arm, a sleeve attached to one end of said arm, wherein said sleeve is adapted to receiving a bolt through said sleeve, and a tube grip attached to a second end of said arm, wherein the grip is "U" shaped and rests upon, half wrapping around, a tube gate tube. Tube gate latch can further be provided with a chain hook, a chain attachment ring, and a chain a chain attached to said chain attachment ring and removably attachable to said chain hook.

The tube gate latch of the present invention presents numerous advantages, including: (1) enables a person while leading an animal thorugh a gate to unlatch the gate with one hand while holding the lead rope with the other hand; (2) reduces the chance for injury to the person or animal; and (3) convenient and efficient. Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

FIG. 2A shows another embodiment of the invention.

DETAILED DESCRIPTION

Figure 1:
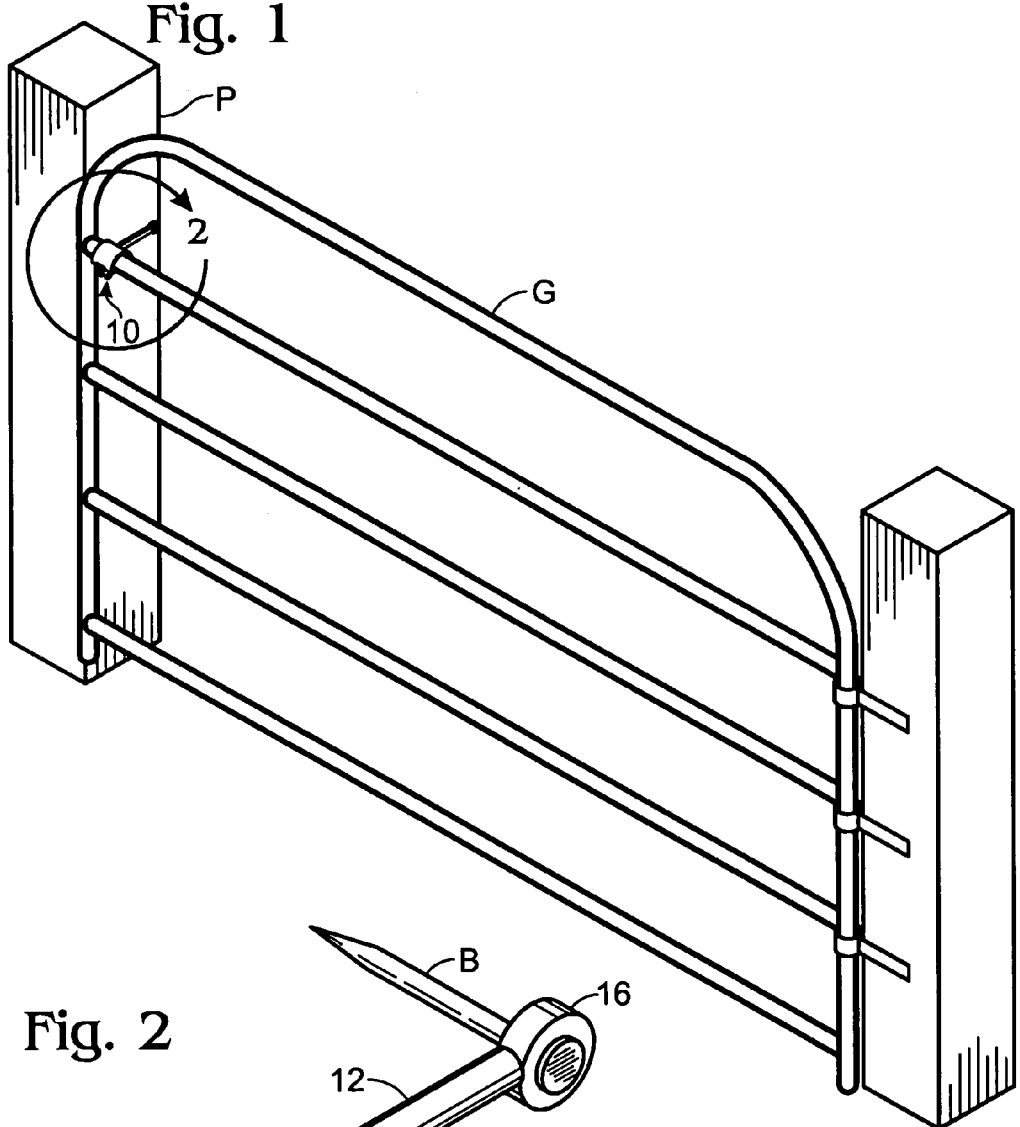
FIG. 1 shows an environmental view of an embodiment of the invention as situated on a tube gate and post.

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

As shown in FIGS. 1–4, a tube gate latch 10 includes a latch arm 12, a sleeve 16 attached to one end of said arm, wherein said sleeve is adapted to receiving a bolt B through said sleeve, and a tube grip 14 attached to a second end of said arm, wherein the grip is "U" shaped and rests upon, half wrapping around, a tube gate tube G. Tube gate latch 10 can further be provided with a chain hook 20, a chain attachment ring 18, and a chain 22 attached to said chain attachment ring and removably attachable to said chain hook 20.

In preferred embodiment, the diameter of the sleeve 16 is sufficient to allow passage of a large bolt or nail 24 through the sleeve 16 and attaching the tube gate latch 10 to the fence post P, so that the tube gate latch 10 is between the fence post P and the tube gate G. Likewise, the length of the sleeve 16 must not be so long as to prevent a bolt or nail 24 from securely fastening to the fence post P and holding up the tube gate latch 10.

Figure 2:
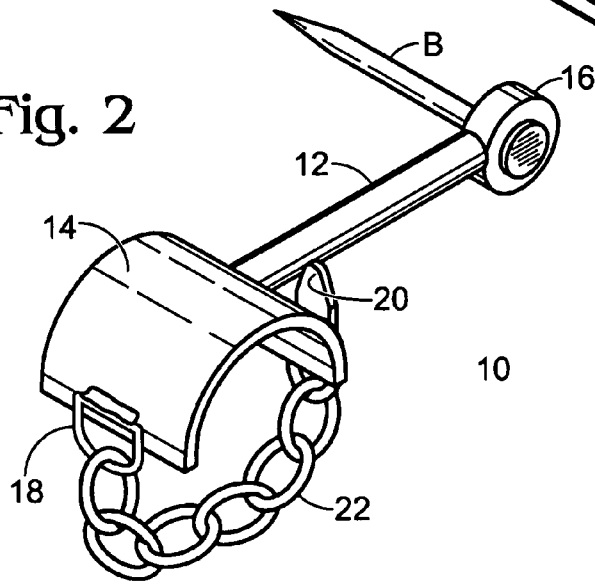
FIG. 2 shows a detail of the view of FIG. 1.
Figure 3:
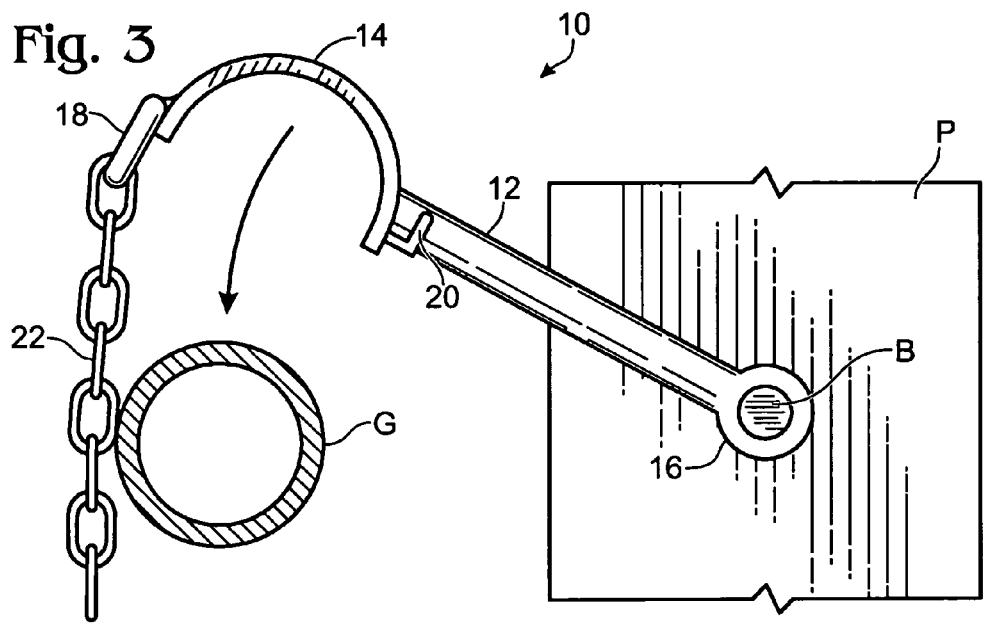
FIG. 3 shows and embodiment of the present invention attached to a tube gate post in an open position.
Figure 4:
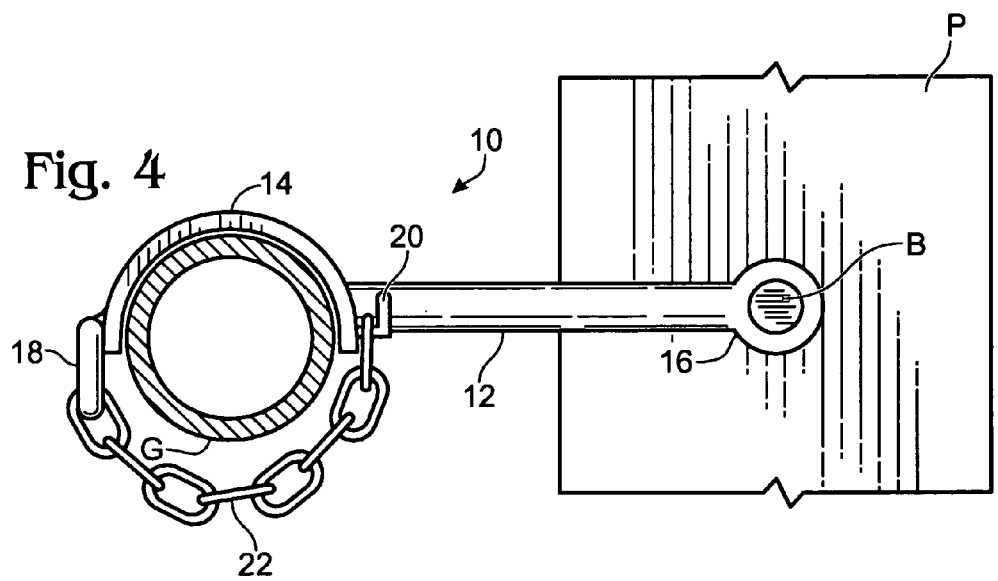
FIG. 4 shows an embodiment of the invention attached to a tube gate post in a closed position.

As shown in FIGS. 2–4, latch arm 12 connects to tube grip 14 on end, and to sleeve 16 on the distal end. The latch arm 12 is long enough as to reach the tube gate G when connected on the sleeve 16, by a bolt 24 through the sleeve 16, to the fence P. However, latch arm 12 does not reach a length as to jeopardize the structural durability of the latch arm 12, or to allow for a large between the tube gate G and the fence post P.

As shown in FIGS. 2–4, a tube grip 14 is attached to the opposite end of the latch arm 12. The tube grip 14 is "U"

shaped like a half-pipe. The diameter of the grip 14 is greater than the diameter of the metal tubes that comprise a standard tube gate G. When the tube gate latch 10 is in operation, the grip 14 lies over a metal tube on the tube gate G to attach the tube gate G to the fence post P.

As shown in FIGS. 2–4, a hook 20 is attached to the tube gate latch 10, preferably on the latch arm 12. Hook 20 is attached in the preferred embodiment by welding. Those skilled in the art know that there are many ways that the hook 20 can be attached to the latch arm 12. Hook 20 can be attached to other items without sacrificing the functionality of the invention. The chain 22 wraps around a tube on the tube gate G and is attached to the hook 20 to lock the tube gate in.

As shown in FIGS. 2–4, a chain attachment ring 18 is provided on the outside edge of the grip 14. The chain attachment ring 18 connects a chain 22 consisting of standard elliptical links to the grip 14. The length of the chain 22 is such that it may wrap around a tube on the tube gate G and attach to the hook 20. The chain attachment ring 18 is preferably semi-circular or semi-elliptical in shape with a diameter large enough to allow free movement of said chain 22 during operation.

All components of the tube gate latch may be constructed of steel, aluminum, or any other substance that can withstand numerous jarring movements from the tube gate, as well as exposure to the elements (if the tube gate latch is used outdoors).

In operation in one embodiment, a tube gate latch 10 in the open position, as shown in FIG. 3, is attached to a fence pole, see FIGS. 1 and 3, and swings down onto the tube gate tube G to close, see FIGS. 1 and 4. Chain 22 wraps around tube gate tube G and attaches to hook 20 to secure the tube gate latch 10 to the tube gate G. The tube gate latch 10 can be attached to a fence post P with a bolt or nail B that goes through the sleeve 16. The bolt or nail B through the sleeve 16 should be inserted to fit the tube gate latch 10 against the post P, but not so tight as to prevent the tube gate latch 10 from pivotally moving.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. A tube gate latch, comprising;
   a latch arm;
   a sleeve attached to one end of said arm, wherein said sleeve is adapted to receiving a bolt through said sleeve; and
   a tube grip attached to a second end of said arm, wherein the grip is "U" shaped, and for resting upon, half wrapping around, a horizontal tube gate tube;
   a chain hook attached to said latch arm; a chain attachment ring attached to said tube grip; and a chain attached to said chain attachment ring and removably attachable to said chain hook.

2. A tube gate latch comprising: a latch arm; a sleeve attached to one end of said arm, wherein said sleeve is adapted to receiving a bolt through said sleeve; a tube grip attached to a second end of said arm, wherein the grip is "U" shaped, and for resting upon, half wrapping around, a horizontal tube gate tube;
   a chain hook attached to said tube grip;
   a chain attachment ring attached to said tube grip; and
   a chain attached to said chain attachment ring and removably attachable to said chain hook.

* * * * *